March 10, 1959  J. B. VAUGHAN  2,876,718
ROTARY FERTILIZER INJECTOR
Filed April 10, 1953  5 Sheets-Sheet 1

INVENTOR
JOHN B. VAUGHAN
BY Strauch, Nolan & Diggins
ATTORNEYS

United States Patent Office 2,876,718
Patented Mar. 10, 1959

2,876,718

ROTARY FERTILIZER INJECTOR

John B. Vaughan, Holdrege, Nebr.

Application April 10, 1953, Serial No. 348,053

17 Claims. (Cl. 111—7)

The present invention relates to means for dispersing fluids into the ground and more particularly to apparatus for distributing soil nutrients in liquid or gaseous form by injecting them into the soil below the level of the ground.

The invention herein disclosed has been developed primarily as a means for treating crop-bearing soil with gaseous fertilizers such as anhydrous ammonia ($NH_3$ fertilizer) but it will be apparent to those skilled in the art that the application of the invention is not so limited and it may be used for other purposes.

It has long been known that a plentiful supply of nitrogen in the soil is necessary to proper growth of plant life and in recent years, gaseous fertilizers such as anhydrous ammonia have come into use as a ready source of nitrogen.

Under normal atmospheric conditions of temperature and pressure, ammonia takes the form of a gas, but is readily liquefied at a temperature of 20° C. and a pressure of 8.5 atmospheres. Obviously, then the only commercially feasible manner of handling and storing ammonia is under liquefying pressure in suitable containers. Application of the ammonia to the soil has been affected heretofore by means of a subsoiler, plow or similar agricultural implement having a supply tube attached thereto and communicating with a tank of ammonia. As the implement is drawn through and turns up the soil, ammonia is dispensed through the tube and into the ground. The success of such a procedure is extremely limited in that the acreage being processed must be in a particular condition to be susceptible of even moderately satisfactory treatment. For example, a field covered with cornstalks, vines or the like, or containing a high percentage of "trash" could not be properly treated because such soil conditions provided obstructions to the passage of the applicator, lifting it from the ground or fouling around it. Thus, the implement cuts a ragged furrow in the soil and much of the fertilizer gas escaped. Furthermore, the supply tube frequently became plugged, particularly in wet soil and it was not feasible to attempt application during the farming season because the applicator implement exposed or damaged the roots of the standing crops.

The present invention contemplates apparatus for effectively and economically applying gaseous fertilizers to fields in any condition comprising, generally, rotary coulters or similar soil-cutting implements having a plurality of radially disposed distributor tubes thereon and valving means for successively connecting the tubes with a source of fluid under pressure.

It is one important object of the invention to provide novel apparatus for applying fluids to the soil.

It is an additional object of the invention to provide novel rotary fertilizer distributors which cut a narrow even furrow in the soil for the reception and retention of fertilizer and therefore are capable of treating fields bearing a young standing crop without danger of injury to the plants or their root systems.

Yet another object of the invention is to provide novel fertilizer distributors in which fertilizer is fed into the ground by a plurality of perforated tubes so constructed and arranged that the perforations will not become clogged by the soil.

It is a further object to provide improved fertilizer distributors, including cut-off valves, in which fertilizer is ejected only when the distributor tubes are advantageously located in the soil.

Another object of the invention is to provide improved distributor units which are quickly and easily attached to the tool bar of conventional implement tractors.

A further object of the invention is to provide novel fertilizer distributors constructed principally of standard manufactured parts and which function without substantial leakage of the fertilizer being applied.

Still another object of the invention is to provide improved fertilizer distributors which are relatively inexpensive to manufacture, simple to operate, are rugged and dependable in the field, and generally overcome the problems encountered in comparable prior art devices for fertilizer distribution.

These, and further objects and advantages will be apparent to those skilled in the art from a reading of the following description in conjunction with the subjoined claims and the annexed drawings in which:

Figure 1:
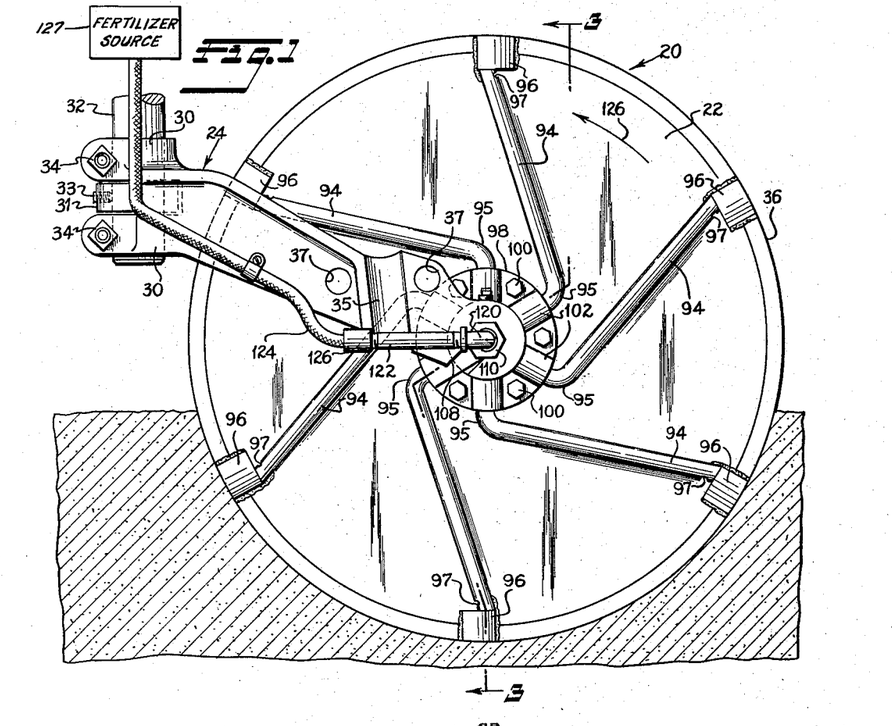
Figure 1 is a side elevation of one embodiment of the invention.
Figure 2:
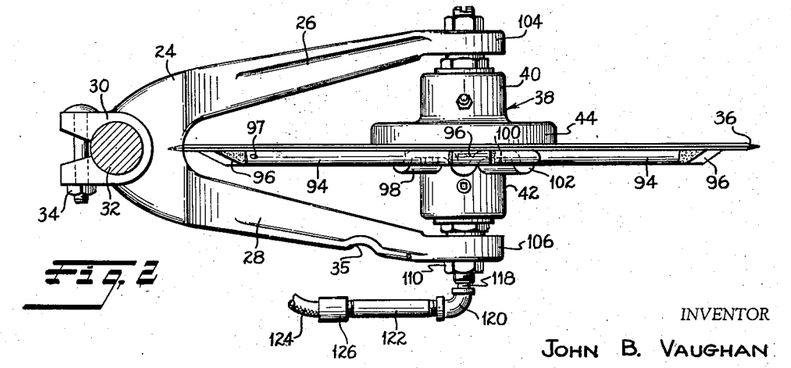
Figure 2 is a top plan view of the form of fertilizer distributor shown in Figure 1.

Referring to the drawings and particularly to Figures 1 and 2, numeral 20 designates, generally, one embodiment of the fertilizer distributor of the present invention which comprises a coulter disc 22, rotatably mounted in a bifurcated member or wheel fork 24, having spaced legs 26 and 28. The fork 24, at the junction of legs 26 and 28 is formed with a pair of vertically spaced split collars 30 adapted to freely rotatably receive the draw pin or shank 32 of a tool bar, not shown, mounted on a means, also not shown. The collars are provided with suitable means such as nut and bolt assemblies 34 for drawing the collars around the shank to eliminate excessive clearance. Sufficient clearance, however, is left in adjusting the collars to permit the fork 24 to caster freely around the shank 32. A collet 31 is disposed on shank 32 between collars 30 and locked to the shank, as by means of a set screw 33 to prevent axial displacement of the fork along the shank. The collars 30 have been described as adjustable to take up wear, etc., but it will be understood that they may be simple annuli of suitable internal diameter to rotatably receive shank 32.

Conventional power means, not shown, such as an hydraulic cylinder, is provided on the tractor to raise and lower the tool bar (not shown) carrying pin 32 and thus control the working depth of the coulter disc 22, which, for the purpose of this invention is usually embedded in the earth to the extent shown in Figure 1 that is, to substantially one-third of its diameter. The coulter disc 22 is formed with a knife-edge 36 at its circumference to facilitate penetration of the soil.

The fork 24, being a standard part, is shown as having an arcuate groove 35 and bolt holes 37 on leg 28 which grooves and bolt holes ordinarily accommodate the attachment of a jointer plow but have no utility in the present embodiment of invention.

Figures 3, 4, 5, 6:
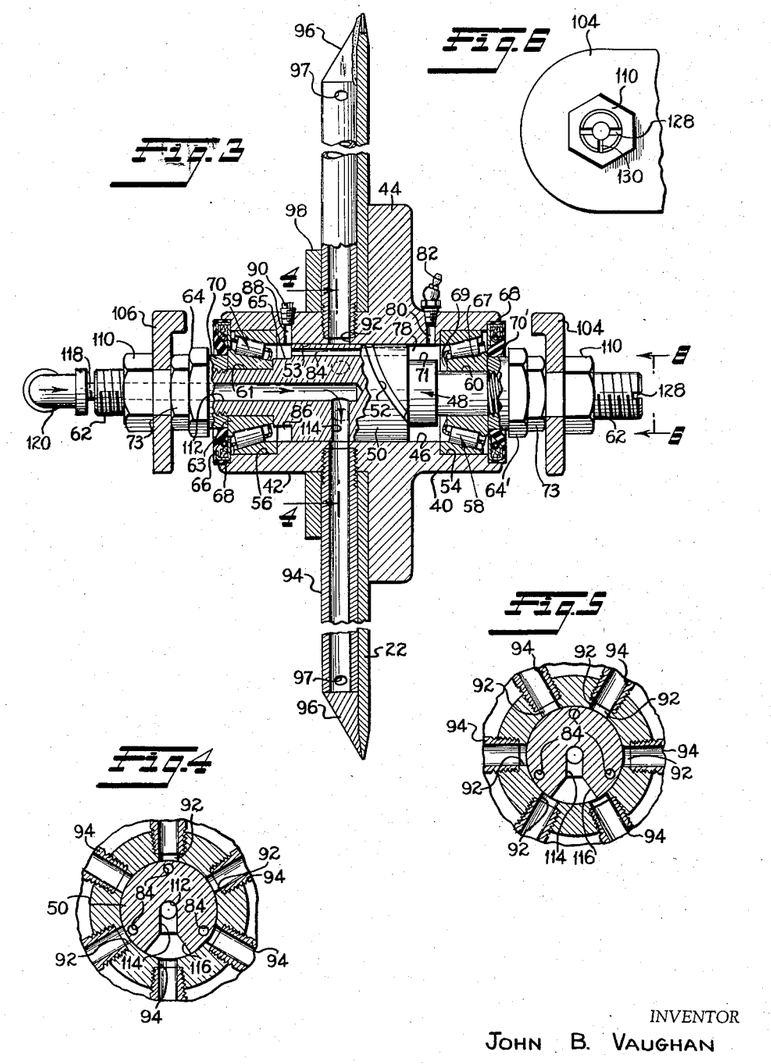
Figure 3 is a view partly in section taken on line 3—3 of Figure 1.
Figure 4 is a fragmentary sectional view taken on line 4—4 of Figure 3.
Figure 5 is a view similar to Figure 4 with parts rotated to a different relative position.
Figure 6 is a fragmentary side elevational view showing one end of the axle as viewed in the direction of arrows 6—6 of Figure 3.

Coulter disc 22 is mounted on a unitary hub element 38, preferably formed by casting to reduce manufacturing costs. The hub element consists, generally, of a pair of cylindrical portions 40 and 42 spaced by a radially extending integral flange 44. As best shown in Figure 3 the hub casting 38 is provided with an internal, axial bore 46, the peripheral surface of which is machined and honed to a very high finish. The hub 38 is rotatably mounted on an axle member, indicated generally by reference numeral 48, having a cylindrical enlargement 50 substantially midway between its ends. The surface of the enlargement 50 is ground into a smooth finish forming a close tolerance fit in the bore 46, and is provided with U-shaped lubricant grooves 52 and 53.

Still referring to Figure 3, the ends of bore 46 are provided with counter-bores 54 and 56 to accommodate tapered roller bearing assemblies 58 and 59 respectively, which journal reduced portions 60 and 61 of the axle 48.

The outer ends of reduced sections 60 and 61 of the axle are threaded as at 62, and, in order to facilitate proper assembly of the device, the unthreaded length of section 61 is made substantially equal to the width of the inner race 63 of bearing assembly 59 while the unthreaded length of section 60 is substantially longer than the width of the inner race 67 of bearing 58. Thus, in assembling the axle in the hub, the outer race of the bearings 58 and 59 are seated in counter-bores 54 and 56 and a nut 64 having an integral cylindrical extension or land 70 is threaded up snugly to lock the inner race 63 of bearing 59 against a shoulder 65, thereby axially locating the axle 48 relative to bore 46. At the opposite end of the axle, another nut 64′ having a cylindrical extension 70′ is threaded against the inner race 67 of bearing 58. Since the reduced axle portion 60 is longer than the width of inner race 67, a clearance space 69 remains between the inner race and shoulder 71. Consequently, tightening nut 64′ has the effect of pre-loading the bearings and space 69 is sufficient to allow periodic readjustment of the bearings in order to compensate for wear. Jam nuts 73 serve to lock nuts 64 and 64′ against dislocation.

Dirt and oil seals 66 preferably of standard size and design are located with a snug fit in suitable annular seats 68 at the extreme ends of the hub 38 and form an effective seal with the cylindrical lands 70, 70′ which, in this embodiment, are integral extensions of the nut 64 and 64′. However, the lands 70, 70′ may take the form of cylindrical extensions of the inner races of the bearing assemblies 58 and 59, such as extensions 212 shown in the modified construction of Figure 12, in which case, nuts 64 and 64′ would be common nuts such as 213, Figure 12.

Shoulder 71 is considerably greater in axial extent than 65 and coacts with bore 46 to form an annular chamber 78 for the reception of plastic lubricating material, such as common grease, silicone grease, or the like, which is introduced into the chamber under pressure as by means of radial duct 80 having a suitable pressure fitting 82.

The plastic material entering chamber 78, is forced into lubricant groove 52 and into the adjacent bearing assembly 58. Enlargement 50 is provided with a plurality of circumferentially-disposed, axially-extending, through bores 84, as best shown in Figures 3, 4 and 5, and hence, the lubricating material from chamber 78 passes through these bores into a second annular cavity 86, bearing assembly 59 and lubricating groove 53. Thus, all areas requiring lubrication are supplied from the single fitting 82.

Inasmuch as a certain amount of dirt and/or moisture inevitably penetrates the seals 66 and contaminates the lubricant, a radial bore 88, normally closed by a suitable plug 90, is provided in portion 42 of the hub 38. When necessary, the internal hub assembly may be purged of foreign matter and the lubricant renewed without dismantling by removing plug 90 and forcing fresh lubricant or a suitable solvent into fitting 82 and through the hub until the lubricant or solvent issuing from the bore 88 appears clean.

The portion 42 of the hub 38 contains a plurality of evenly spaced radial bores 92 having threaded outer ends threadedly receiving the inner ends of a like number of tubes 94 the outer ends of which terminate in and are closed by wedge-shape cleats or lugs 96 secured, preferably by welding, adjacent the periphery of the disc. Six tubes have been shown but it will be obvious that a different number may be used.

As will be seen in Figure 1, the cleats 96 for each of the tubes 94 are circumferentially offset or staggered, forwardly in the direction of rotation relative to the corresponding bores 92, i. e., the cleats lead the corresponding bores. The inner ends of the tubes are curved as at 95 while the remaining portions thereof are straight and fall on a chord line of the disk. The amount which the respective bores and cleats are offset or staggered (approximately 60° in the present exemplary embodiment) is such that when the disc is rotated in the course of operation of the device, as will hereinafter be described, each tube will assume a substantially horizontal position as it leaves the ground. This construction has two particularly important advantages: (1) the curved tubes absorb the inherent flexing of the disk without breaking and (2) the positioning of the tube tends to improve the trapping or confinement of the gas in the ground.

Cleats 96 are tapered to a sharp edge coinciding with the knife edge 36 of the coulter disc 22, so as not to interfere with the penetration of the soil by the disc. Each tube is provided with a discharge port or hole 97, located on the trailing or backside of the tube in the direction of rotation of the disc. Cleats 96 extend circumferentially a substantial distance beyond the perforate side of the tube so as to shelter the holes 97 from an accumulation of soil and thus prevent clogging.

Tubes 94 are fixedly secured to the cleats 96 and the cleats to the periphery of the disc by suitable means such as welding. Inasmuch as the cleats and tubes are subject to the highly abrasive action of the soil, it is preferred to form the tubes of extruded steel tubing and the cleats of a hard ferrous alloy such as "Stoodite."

A rigid corrugated retainer ring or washer 98, provided with suitable fasteners such as bolts or cap screws 100 which pass through holes in the ring 98 and disc 22, and thread into tapped holes in flange 44, clampingly secures the tubes 94 to the adjacent face of the disc and the disc against the flange. The corrugations 102 of ring 98 closely surround the radially inner ends of tubes 94 and thus reinforce the tubes against deflection and dislocation.

The legs 26 and 28 of the fork 24 terminate in apertured bosses or trunnions 104 and 106 which receive the respective ends of axle 48, trunnion 106 being slotted as at 108 to permit insertion of the axle. Nuts 110 threaded on each end of the axle secure it in non-rotatable position between the legs of the fork as best shown in Figures 2 and 3.

Referring to Figures 3, 4, and 5, one end of the axle 48 contains an internal axial bore 112 extending into the cylindrical enlargement 50 where it joins, at right angles, with a radial duct 114 in the same radial plane as the axes of bores 92. The duct 114 flares out to form an elongated port 116 adapted to register with bores 92 at the surface of the cylindrical enlargement 50. The construction and assembly procedure hereinabove described insures the proper location of the axle 48 in bore 46 so that bores 92 and port 116 fall in a common plane substantially perpendicular to the axial center-line of axle 48. As best shown in Figure 5, the circumferential dimension of port 116 is sufficient to bridge two adjacent bores 92 from the center line of one to the center line of the other for a purpose which will appear in the description of the operation of the device.

The outer end of axle bore 112 is internally threaded to receive one end of a standard threaded pipe nipple 118. A standard pipe elbow 120 is threaded on the nipple and carries a second nipple 122 (Figures 1 and 2). A flexible hose 124, connected to nipple 122 by any suitable means such as coupling 126, connects the bore 112 with a source 127 of anhydrous ammonia fertilizer, for example, under pressure. A conventional valve means, not shown, is provided adjustably to control the flow of ammonia through the tube 124.

The operation of this embodiment is as follows: The tractor tool bar, not shown, carrying the shank 32, is normally elevated until the implement is ready for use, at which time the conventional hydraulic implement controls are manipulated to lower the shank 32 until the coulter disc 22 is embedded in the ground to the desired depth. The forward motion of the tractor means causes the disc 22 to rotate in the direction of the arrow 126, Figure 1, whereupon the valve, not shown, controlling the flow of ammonia, is opened and adjusted to meter the desired rate of flow of ammonia through the tube 124 and into the bore 112, via nipples 122, 118 and elbow 120, and thence through radial bore 114 and elongated port 116 in the axle enlargement 50.

It will be appreciated that, once the liquid ammonia passes from the storage tank and through the metering valve, it will assume a gaseous state and is in such state when it enters bores 112 and 114. The precision fit between the highly finished surfaces of enlargement 50 and bore 46 cooperate to form an effective seal against the escape of gas.

Referring to Figures 4 and 5, the rotation of the hub 38 about the fixed enlargement 50 causes radial bores 92 to pass sequentially into and out of registration with the port 116 so that these openings act as a valve means causing the ammonia to flow through the corresponding tubes 94, and issue from ports 97. As will be seen in Figures 4 and 5, the port 116 is so located that only the tubes below the ground level register with the port 116. The exact position of the port 116 can be varied to advance or retard the point at which flow starts and is cut off. This adjustment is accomplished by loosening nuts 110 and rotating the axle 48 a few degrees in the desired direction. As best appears in Figure 6, a slot or kerf 128 is provided at one end of the axle 48 to serve as a tool engaging recess for the insertion of a screw driver or similar device for rotating the axle. An additional groove or scribe mark 130 is located on the axle in co-planar alignment with the center line of port 116, in order to indicate the position of port 116 when making adjustments.

Referring to Figure 5, the port 116 at the surface of enlargement 50 extends from the center line of a bore 92 coming into registration with the port 116 to the center line of a bore 92 going out of communication with port 116. Thus the flow of ammonia into the soil is uninterrupted during the change over from tube to tube. It is preferable in making adjustments to the position of port 116 that the port be kept within 15° or 20° of the vertically downward position shown so that the incoming tubes do not register before they are sufficiently below ground level to prevent escape of ammonia into the atmosphere and so that the outgoing tubes have sufficient time to discharge the ammonia remaining in the tubes after cut-off before they are too close to the surface.

The knife-edge disc cuts a narrow, even furrow thus preventing escape of the gaseous ammonia and avoiding any substantial disturbance of the soil which might be detrimental to standing crops. As the coulter disc passes, much of the soil falls back into the furrow and further prevents escape of the ammonia gas, which, having an affinity for soil, is quickly absorbed.

The cleats 96 function effectively to shelter the holes 97 and thus prevent clogging which would ordinarily occur, particularly in wet soil.

Figures 7–11, inclusive, illustrate a modification of the basic invention with like parts designated with like reference numerals. This form of construction utilizes the same standard fork 24 shown fully in the embodiment of Figure 1, attached to the tractor means in the same manner. The coulter disc 22 is of a type having spaced peripheral notches 131, the purposes of which are two-fold: (1) They improve the ground engagement of the disc to reduce slippage and (2) in treating fields containing cornstalks and the like, they engage the stalks and draw them down under the coulter disc, thus preventing them from projecting between the legs of the fork and fouling around the axle and hub.

It will, of course, be understood that the disc 22 of the embodiment shown in Figures 1–6 and of further modifications hereinafter to be described, may be similarly notched with equal advantage and conversely the notches 131 may be omitted from the modification now being described.

In addition, it will be noted that the distributor tubes 94' of the present embodiment are straight and are radially rather than chordally arranged on the disc 22, and it will be understood that, while the angulated tubes and chordal arrangement is preferred, the straight tubes and radial arrangement may be used in all embodiments disclosed herein, at the sacrifice, of course, of the advantages afforded by the preferred construction.

Figures 9, 10, 12:
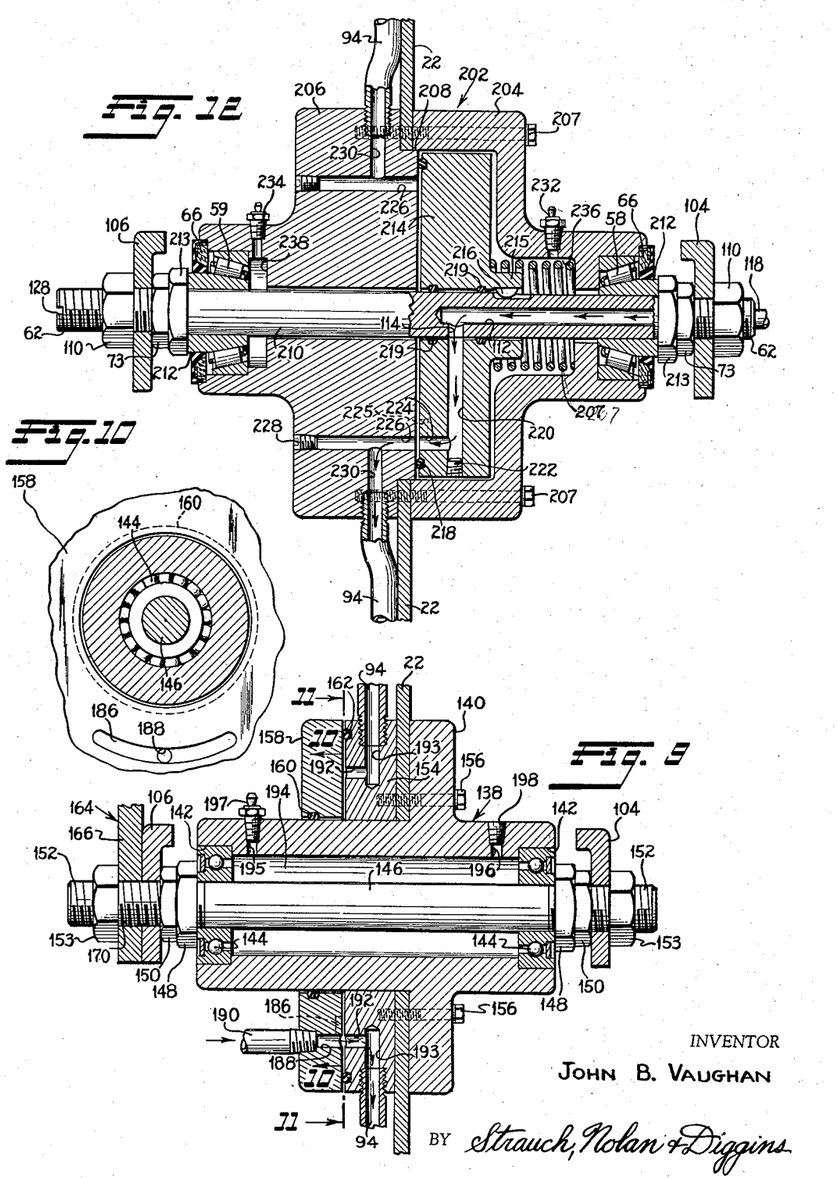
Figure 9 is a sectional view taken on line 9—9 of Figure 7.
Figure 10 is a view partly in section taken on line 10—10 of Figure 9.
Figure 12 is a sectional view similar to Figure 3 of another modification of the invention.

Referring particularly to Figure 9, a substantially cylindrical hub 138 is cast or otherwise formed with an integral radial flange 140 although it will be appreciated that the flange may also be a separate ring keyed to the hub. The extreme ends of the hub 138 are recessed as at 142 to provide seats for pre-sealed ball bearing cartridges 144 which journal the hub on an axle member 146. Nuts 148 locked by jam nuts 150, all threaded on threaded end portions 152 of the axle 146 position the hub on the axle and prevent axial dislocation thereof.

The coulter disc 22 and an annular member 154, hereinafter referred to as a collector ring, are fixedly secured to the hub 138 as by means of bolts 156 passing through flange 140, disc 22 and threaded into suitable tapped holes in the ring 154.

A second annular member 158, hereinafter referred to as a distributor ring, is rotatably journaled on hub 138 with an O-ring or similar packing element 160 provided to form a fluid-tight seal between the hub and the inner diameter of the ring 158. Another O-ring 162 forms a seal between the adjacent faces of rings 154 and 158.

The hub and axle assembly is mounted between the legs 26 and 28 of the fork 24 in the same manner as in the embodiment of Figures 1–6 with threaded portions 152 extending through apertured trunnions 104 and 106 where they are engaged by nuts 153 which lock the axle 146 against rotation in and displacement from the fork.

Figure 7:
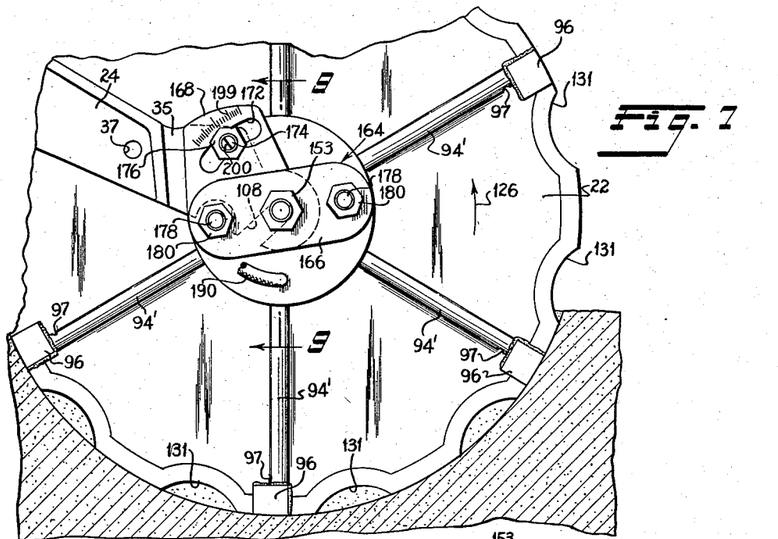
Figure 7 is a fragmentary side elevation similar to Figure 1 of a modified form of the invention.
Figures 8, 11:
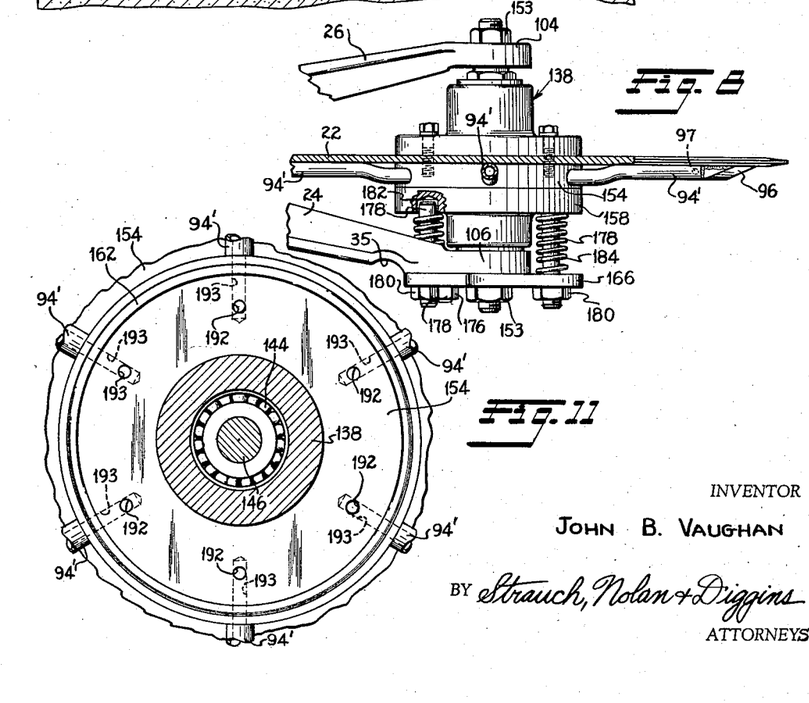
Figure 8 is a top plan view partly in section of the modified form of the invention shown in Figure 7.
Figure 11 is a view partly in section taken on line 11—11 of Figure 9.

As best shown in Figures 7 and 8, an adjustment and spring-abutment bracket 164 taking the form of an L-shaped plate having legs 166 and 168, has an aperture 170 (Figure 9) substantially midway between the ends of leg 166, adapted to receive one end of the axle 148. The leg 168 contains an arcuate slot 172 having the longitudinal axis of axle 138 as its center of curvature. A stud 174, is provided in one of the bolt holes 37 normally present on the fork for the attachment of a jointer plow as explained in conjunction with Figure 1 and extends through slot 172 to be engaged by a locking nut 176.

Referring to Figures 7 and 8, each end of leg 166 carries an anchor pin or stud 178, secured as by nuts 180 and extending into oversize holes 182 in the ring 158 to lock the ring against rotation. Coil springs 184 surround the pins 178 and are compressed between the leg 166 and ring 158, thereby biasing the latter into face to face sealing contact with ring 154.

The inner face of ring 158 is provided with an arcuate groove 186 which communicates with a bore 188 threadedly receiving a flexible supply tube 190 extending from a source 127 of anhydrous ammonia or other fluid under pressure. The adjacent face of ring 154 contains a number of circumferentially spaced bores 192 terminating at substantially right angles to a like number, of radial bores 193 extending to the outer periphery of ring 154 where they are threaded to receive tubes 94' in the same manner as in the first disclosed embodiment. Bores 192 are located so as to intermittently register with groove 186, which is of sufficient length to bridge a pair of adjacent ports 192 from the center line of one to the center line of the other.

The inner circumference of cyindrical hub 138, defines with axle 148 an annular lubricant chamber 194. Radial ducts 195 and 196 are fitted, respectively, with a pressure lubrication fitting 197 and a removable plug 198 so that the supply, purging and renewal of lubricant may be carried out in the same manner as in the construction shown in Figures 1–6.

The operation of the modification is similar to that of the first described embodiment. The hub 138, flange 140, disc 22, ring 154 and tubes 94' rotate as a unit about the axle 146 while the anchor pins 178 preclude rotation of the ring 158. Consequently, ports 192 sequentially register with the groove 186 causing fluid to flow from tube 190 through conduits 188, 186, 192, 193, 94' and issue from ports 97. Except for the means of advancing and retarding the location of the injection period, which will be described presently, the operation of this modification as well as the remaining details of construction are in all respects identical to the form of the invention shown in Figures 1–6.

As has already been pointed out, injection of the fertilizer is desirable only when the exit ports 97 are below ground level and, hence, the device is usually adjusted so that ports 192 register with groove 186 only while ports 97 on the corresponding tubes 94' are embedded in the soil.

Adjustment of the injection period is accomplished by rotating ring 158 a few degrees in the desired direction to move groove 186 clockwise or counterclockwise from the central, bottommost position shown in Figure 10. To make this adjustment, nut 176 and, if necessary, nuts 153, are loosened and the bracket 164 rotated right or left about the axle 146; pins 178 will cause corresponding movement of ring 158. The position of the center of groove 186 may be determined from the position of bore 188 which is externally manifested by the tube 190 or, if desired, suitable calibrations 199 (Figure 7) may be inscribed along slot 172 and a scribe mark 200 provided on the end of stud 174.

A third embodiment of the invention is shown in Figure 12 wherein parts common to the previously described constructions are given the same reference numerals. In this embodiment the hub, indicated generally at 202 comprises a hollow member 204 and a substantially solid member 206 having a pilot extension 208 adapted to fit into the hollow interior of member 204. Coulter disc 22 is centrally apertured to receive the extension 208 and is clamped between hub members 204 and 206 by means of a number of circumferentially spaced bolts 207 passing through member 204, disc 22 and threaded into member 206.

The hub assembly is mounted on an axle 210 and the axle mounted in fork trunnions 104 and 106 in the same manner as shown in Figure 3 except that lands 70, 70' on nuts 64, 64' of Figure 3 are formed as cylindrical extensions 212, integral with the inner races of the bearing assemblies 58 and 59. Either of these alternative constructions may be employed on either embodiment.

A flat-sided ring 214 having a central boss 215 is disposed within the interior of hub member 204, is non-rotatably secured to axle shaft 210 as by means of a key and slot arrangement 216 and is resiliently biased against the hub member 206 by a coil spring 207. An O-ring 218, disposed between the adjacent faces of ring 214 and hub member 206 and O-rings 219 between the rings 214 and axle 210 provide an effective sealing of the assembly against the escape of fluids. As in the construction shown in Figure 3, one end of the axle 210 contains an axial bore 112 extending to a point within the ring 214 where it joins a radial duct 114. Ring 214 is provided with a radial passage 220 which is so located as to be in coaxial alignment with duct 114 when the ring 214 is located and secured to the axle 210 by the key and slot assembly 216. For manufacturing convenience passage 220 may be drilled from the outer periphery of ring 214 and provided with a plug 222. A short bore 224 extends at right angles to passage 220 and terminates in an arcuate groove 225 (similar to groove 186, Figure 10) on the face of ring 214, adjacent the face of extension 208 on hub member 206.

Hub member 206 contains a number of through bores 226 which are parallel to the axle and are circumferentially spaced and adapted to sequentially register with arcuate groove 225 in the same manner as in the embodiment of Figures 7–11. Each of the bores 226 is provided with a removable plug 228 and is intersected at right angles by a radial bore 230 each communicating with a tube 94 threadedly secured to the hub member 206 as in the previously described embodiments.

Lubrication means are provided in the form of pressure fittings 232 and 234 communicating with lubricant chambers 236 and 238, respectively, whereby grease or other suitable lubrication material may be supplied to all necessary locations.

The remaining structural details are in all respects identical to those disclosed in Figures 1–11 inclusive.

In operation, fluid under pressure supplied to nipple 118 passes through conduits 112, 114, 220 and 224 to arcuate groove 225, the disc 22 and hub assembly 202 revolve relative to the ring 214, which is fastened to the stationary axle 210 causing bores 226 to pass sequentially into and out of registration with the groove 225 allowing fluid to pass through tubes 94 and out of ports 97 into the soil. The location of the groove 225 may be adjusted by turning the axle in the same manner as in the embodiment of Figures 1–6.

A particular feature and advantage of the construction shown in Figure 12 is that bores 226 function as a trap to collect any foreign particles which might enter the ports 97 during a portion of the cycle when no outward flow of fertilizer is occurring. In that event, such particles fall through tubes 94 and into bores 226. The clearance between the adjacent faces of member 206 and ring 214 is appreciably exaggerated for clarity of illustration but, in actual practice would be small and would preclude the passage of any foreign particles of substantial size. Inasmuch as fluid flow occurs through passage 224 at all times during operation, particles would not enter and therefore would be effectively trapped in bores 226. After a period of use, any accumulation of dirt and the like in bores 226 may be cleaned out, for example, by removing plugs 228, connecting a compressed air line to nipple 118, and rotating the disc and hub assembly through at least one complete revolution so that each of the bores 226 registers with groove 225 at least once and is purged by a blast of air.

Figures 13, 14, 15:
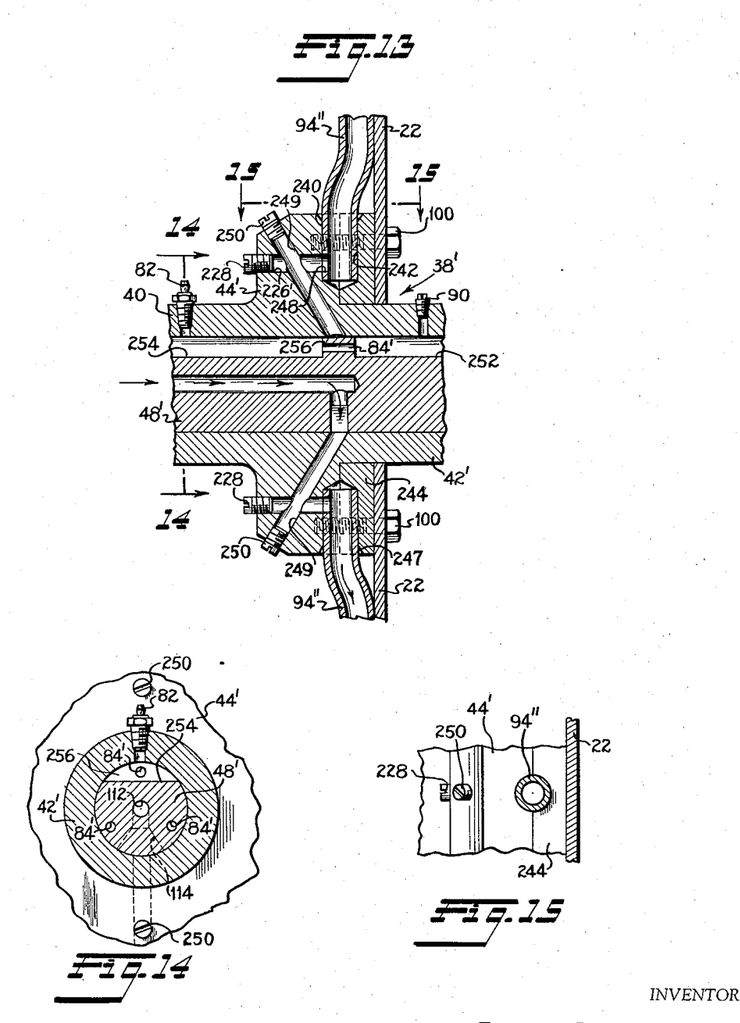
Figure 13 is a fragmental, sectional view similar to Figure 12 of a still further modification of the invention.
Figure 14 is a sectional view taken on line 14—14 of Figure 13.
Figure 15 is a fragmental plan view partly in section taken on line 15—15 of Figure 13.

A fourth and final embodiment of the invention is shown in Figures 13, 14 and 15 which show a form of construction in many respects similar or identical to the first and third embodiments as depicted in Figures 3 and 12. To avoid repetitious descriptive matter, all identical structure occurring in the fourth species which also appears in the first and/or third will be identified with common reference characters and will not be described in detail; all similar, corresponding structure will be given common reference characters bearing prime marks. In this embodiment, as in the embodiment shown in Figure 3, the hub element, indicated generally at 38', is a unitary structure having hollow hub portions 40 and 42' mounted on an axle 48' in the same manner as shown in Figure 3 and described hereinabove.

An annular flange or boss 44' on hub 38' interrupts the continuity of hub portions 40, 42' and is formed with a plurality of radial semi-cylindrical recesses 240, adapted to register and mate with similar recesses 242 on a ring 244, to form cylindrical wells or sockets of somewhat smaller diameter and adapted to receive the inner ends of tubes 94" which in the present embodiment are unthreaded. Bolts 100, passing through suitable holes in disc 22 and ring 244 and threaded into boss 44', secure the disc on the hub and clamp the halves of the sockets into a crushing fit on the tube ends. With this arrangement it is possible to replace single tubes without disassembly of the unit beyond the loosening of bolts 100. The radially outer ends of the sockets are chamfered as at 247 or formed with a radius to prevent any cutting or shearing action during the clamping procedure or due to flexing of the tubes during operation.

For each of the tubes, boss 44' is provided with a bore 226' which extends through the boss and into the side wall of semi-cylindrical recess 240. Ports or apertures 248 are so located in the side wall of the inner end of tubes 94" as to register with bores 226' when installed in their respective sockets as hereinabove described. Bores 226' are the counterparts of bores 226, Figure 12, functioning to conduct fluid from the valve means in the hub to the distributing tubes, the outer ends of the bores being closed by removable plugs 228 to permit cleaning.

Bores 226' are each intersected by angular bores 249 extending from the exterior of the boss 44, where they are closed by removable plugs 250, to the interior bore 46 of the hollow hub 38'.

In order to provide greater capacity for the lubricant chambers 78 and 86 (Figure 3) end portions of the enlargement 50' is milled down or otherwise formed with flat portions 252 and 254 leaving a circular segment 256 therebetween to seal off those bores 249 which are not in communication with passage 114 as described in the operation of the species of Figure 3.

The operation of the present modification is believed to be obvious from the preceding disclosure, being in all respects identical to that of Figure 3 combined with the dirt trapping and cleaning construction of Figure 12. The increased lubricant capacity materially lengthens the permissible intervals between application and/or renewal of lubricating materials.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed and desired to be secured by United States Letters Patent is:

1. An apparatus for injecting fluid nutrients into the soil comprising a non-rotatable axle member adapted to be non-rotatably received in a frame member, a hub assembly rotatably mounted on said axle member, a coulter disc secured to said hub assembly and having a sharpened peripheral edge, a plurality of tubes secured against one face of said disc extending from said hub assembly toward and terminating in close proximity to said peripheral edge, a plurality of wedge-shaped cleats secured to said disc and to said tubes in sealing relation to the radially outer termini of said tubes and having apices substantially coincident with said peripheral edge, each of said tubes having an aperture in its trailing side wall adjacent said cleats and facing oppositely to the direction of rotation of the disc, a source of nutrient fluid under pressure, and valve means in said hub assembly, operable by the rotation of said hub assembly and said disc sequentially to connect said tubes with said source.

2. The apparatus defined in claim 1 wherein said cleats extend circumferentially and subtend a larger radial angle than the termini of said tubes to which they are secured and extend from the leading side wall of said tubes past the trailing side wall in the direction opposite to the direction of rotation.

3. The apparatus defined in claim 1 wherein a portion of said valve means is movable to vary the point of rotation at which said tubes are connected with said source.

4. The apparatus defined in claim 1 wherein said tubes are curved adjacent the hub and have straight portions lying along equal chords of said disc.

5. An apparatus for injecting gaseous fertilizer into the soil comprising a wheel fork adapted to be attached for castering movement to a means of locomotion, an axle member mounted in said fork and releasably fixed in non-rotating position and having a substantially cylindrical enlargement thereon, a coulter including a disc and a hub assembly rotatably journaled on said axle member, said hub assembly having an internal cylindrical bore receiving said enlargement, the outer surface of said cylindrical enlargement having a circumferentially elongated port, conduit means in said axle connecting said port with a source of gaseous fertilizer under pressure, said hub assembly having apertures communicating with said cylindrical bore, means defining a plurality of passages connected to and extending outwardly from said apertures in said internal bore of said hub assembly toward the peripheral edge of said disc, said means defining said passages having outer ends fixed to said disc, said passages and said port having axes in a common plane, and said means defining said passages having apertures adjacent the outer ends of said passages, said apertures facing in a direction opposite to the direction of rotation of said disc.

6. An apparatus as defined in claim 5 including means for releasing said axle member from fixed non-rotating position so as to permit rotation of said axle member to vary the positon of said elongated port, whereby an adjustment may be effected in the point of rotation at which said elongated port registers with said passages.

7. An apparatus as defined in claim 6 including means on said axle external of said hub assembly indicating the position of said elongated port.

8. An apparatus for injecting gaseous fertilizer into the soil comprising a wheel fork adapted to be mounted for castering movement on a means of locomotion, an elongated axle member fixedly secured to said fork and having a cylindrical, axially extending enlargement substantially midway between its ends, a unitary substantially cylindrical hub member, anti-friction means for rotatably mounting said hub member on said axle member in close surrounding relation to said enlargement, an axial passage in said axle member extending from one end thereof to the interior of said enlargement, a circumferentially elongated port on the exterior surface of said enlargement, said axle member having an aperture connecting said port with said passage, a plurality of circumferentially spaced threaded bores extending radially through said hub member and adapted to register sequentially with said port, an annular flange on said hub, a soil cutting disc mounted on said hub adjacent said flange, a plurality of tubes threadedly received in said threaded bores and extending chordally along one face of said disc, retainer ring means clampingly securing said tubes to said disc and said disc to said flange, a plurality of cleats fixed to said face of said disc and engaging and closing the outer ends of said tubes, said tube having an aperture therein adjacent said cleats and facing oppositely to the direction of rotation of said disc, said cleats extending circumferentially and subtending a larger radial angle than the outer ends of said tubes and extending substantially beyond said tubes in the direction opposite to the direction of rotation of the disc.

9. The apparatus defined in claim 8 wherein the circumferential dimension of said elongated port is approximately equal to the circumferential distance between the centers of said threaded bores at the inner surface of said cylindrical hub member.

10. An apparatus for distributing gaseous fertilizer comprising a stationary shaft adapted to be mounted on movable frame means, a hub member rotatably mounted on said shaft, a soil-cutting disc and a first annulus secured to said hub member for rotation therewith, a second annulus mounted on said hub member, means biasing said second annulus into abutting engagement with said first annulus, means preventing rotation of said second annulus, an arcuate groove in said second annulus, a plurality of spaced bores in said first annulus adapted sequentially to register with said groove, a plurality of conduits mounted on said disc, means connecting said conduits with said bores, and means connecting said groove with a source of gaseous fertilizer under pressure.

11. An apparatus for injecting gaseous fertilizer into the soil comprising a wheel fork, a fixed axle mounted in said fork, a hub member rotatably journaled on said axle, a soil-cutting disc and a first annulus fixed to said hub member for rotation therewith, a second annulus mounted on said hub member, means resiliently biasing said second annulus into abutting engagement with said first annulus, means defining an arcuate groove in said second annulus, a plurality of spaced bores in said first annulus adapted sequentially to register with said groove, a plurality of conduits mounted on said disc, means connecting said conduits with said bores, means connecting said groove with a source of gaseous fertilizer under pressure, a normally stationary bracket mounted on one end of said axle in a fixed angular position, means selectively operable to adjust the angular position of said bracket, and means operatively connecting said bracket and said second annulus, whereby said second annulus is normally retained in a stationary condition and may be selectively rotated by angular adjustment of said bracket to vary the angular disposition of said arcuate groove.

12. The apparatus defined in claim 11 including externally visible calibrations indicating said angular disposition of said elongated port.

13. An apparatus for distributing fluid fertilizer comprising a fixed axle member adapted to be mounted on movable frame means having an internal axial passage therein, adapted for connection to a source of fertilizer under pressure, a hub assembly rotatably journaled on said axle member, said hub assembly having a solid portion and a hollow portion, the interior of said hollow portion being formed with at least one planar surface perpendicular to said axle member, an annular member fixed to said axle member within the hollow portion of said hub assembly and having a planar surface adjacent the planar surface of said hollow portion, means resiliently biasing said surfaces into face to face contact, an arcuate groove in the planar surface of said annular member, conduit means communicating said groove with said passage, a plurality of through bores in said hub assembly extending from the exterior of said solid portion to the planar surface of said hollow portion, said bores being adapted to register sequentially with said arcuate groove, a coulter disc fixed to said hub assembly, means mounted on said disc defining a conduit substantially perpendicular to each of said bores and extending toward the outer periphery of said coulter disc, and removable means for closing the exterior ends of said bores.

14. A fertilizer distributor comprising a fixed axle adapted to be mounted on movable frame means, a hub assembly rotatably journaled on said axle, said hub assembly having a solid portion and a hollow portion, the interior of said hollow portion being formed with at least one planar wall perpendicular to said axle, a ring fixed to said axle within the hollow portion of said hub assembly and having a planar face in surface contact with said planar wall, a plurality of through bores in said hub assembly substantially parallel to said axle and extending from the exterior of said solid portion to the planar wall of said hollow portion, the center lines of said bores at said planar wall being in a circle, an arcuate groove in said planar face, the locus of all points on the center line of said groove substantially coinciding with said circle, conduit means in said ring communicating with said axle bore and placing said groove in communication with a source of fertilizer under pressure, a coulter disc fixed to said hub assembly, means mounted on said disc defining a conduit perpendicular to each of said through bores and extending to the peripheral edge of said disc, and closure means removably located in the exterior ends of said bores.

15. An apparatus for injecting gaseous fertilizer into the soil comprising an axle adapted to be mounted on movable frame means, a hub assembly rotatably mounted on said axle, a soil cutting disc fixed to said hub assembly, said hub assembly having a plurality of radial bores, conduit means mounted on said disc and extending from said radial bores toward the peripheral edge of said disc, a plurality of passages in said hub assembly intersecting the radially inner ends of said radial bores substantially at right angles, each of said passages having one end terminating exteriorly of said hub assembly, removable closure means in said exteriorly terminating ends, and valve means in said hub assembly for sequentially placing the opposite ends of said passages in communication with a source of fluid fertilizer under pressure.

16. In a fertilizer distributor for distributing fertilizer from a source through an axle having a bore therein, a hub rotatably mounted on said axle and having an annular radial flange; a plurality of radially extending, semi-cylindrical recesses in a radial face of said flange; a clamping ring on said hub having complementary recesses adapted to register with said first mentioned recesses to define a plurality of cylindrical sockets; a disc fixedly mounted on said hub for rotation therewith; a plurality of tubular conduits mounted on said disc extending toward the periphery thereof and having inner ends of slightly larger diameter than said sockets and disposed therein; means for forcing and maintaining said clamping ring against said flange whereby said sockets form a crushing fluid-tight fit around said inner ends of said tubular conduits, said hub having conduit means for successively connecting said tubular conduits to said axle bore.

17. A fertilizer distributor comprising a fixed axle member having a substantially cylindrical axially extending enlargement substantially mid-way between its ends; a hub member rotatably journaled on said axle member and having an axial bore receiving said enlargement; a passage in said axle member extending to the interior of said enlargement and adapted to be connected to a source of fluid fertilizer under pressure; a circumferentially elongated port on the exterior surface of said enlargement in communication with said passage; an annular radially extending flange on said hub member; a plurality of circumferentially spaced semi-cylindrical recesses in a radial face of said flange; a clamping ring on said hub member having complementary recesses adapted to register with said first mentioned recesses to define cylindrical sockets; a soil cutting disc mounted on said hub member for rotation therewith; a plurality of tubular conduits mounted on said disc extending toward the perimeter thereof and having inner ends disposed in said sockets; means for forcing and maintaining said clamping ring against said flange whereby said sockets form a crushing fluid-tight fit around the inner ends of said tubes; bores extending through said flange into said sockets and through the side walls of said tubular conduits; removable closure means in the outer ends of said bores; and conduit means extending from said bores, in said flange to the interior of said hub member and adapted sequentially to register with said port upon rotation of said hub assembly.

References Cited in the file of this patent

UNITED STATES PATENTS

| | | |
|---|---|---|
| Re. 4,597 | Stillman | Oct. 17, 1871 |
| 966,404 | Bodman | Aug. 2, 1910 |
| 1,053,235 | Sparks | Feb. 18, 1913 |
| 1,171,277 | Thayer | Feb. 8, 1916 |
| 1,228,469 | Mueller | June 5, 1917 |
| 2,192,027 | Crowder | Feb. 27, 1940 |
| 2,264,635 | Graham | Dec. 2, 1941 |
| 2,272,757 | Teker | Feb. 10, 1942 |
| 2,318,903 | Thomas | May 11, 1943 |
| 2,337,403 | Myers et al. | Dec. 21, 1943 |
| 2,447,423 | Nies | Aug. 17, 1948 |
| 2,619,054 | Bell | Nov. 25, 1952 |
| 2,649,061 | Hawkins et al. | Aug. 18, 1953 |

FOREIGN PATENTS

| | | |
|---|---|---|
| 144,504 | France | Aug. 12, 1881 |
| 257,961 | Switzerland | May 2, 1949 |